United States Patent
Hoen

(10) Patent No.: US 9,779,592 B1
(45) Date of Patent: Oct. 3, 2017

(54) GEARED HAPTIC FEEDBACK ELEMENT

(71) Applicant: Apple Inc., Cupertino, CA (US)

(72) Inventor: Storrs T. Hoen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 218 days.

(21) Appl. No.: 14/493,190

(22) Filed: Sep. 22, 2014

Related U.S. Application Data

(60) Provisional application No. 61/883,147, filed on Sep. 26, 2013, provisional application No. 61/886,847, filed on Oct. 4, 2013.

(51) Int. Cl.
| | | |
|---|---|---|
| *G08B 1/00* | (2006.01) | |
| *G08B 6/00* | (2006.01) | |
| *H01F 7/06* | (2006.01) | |

(52) U.S. Cl.
CPC .............. *G08B 6/00* (2013.01); *H01F 7/064* (2013.01)

(58) Field of Classification Search
USPC ............................. 340/407.1, 573.1; 345/161
See application file for complete search history.

(56) References Cited

U.S. PATENT DOCUMENTS

| | | |
|---|---|---|
| 3,001,049 A | 9/1961 | Didier |
| 3,390,287 A | 6/1968 | Sonderegger |
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,695,813 A | 9/1987 | Nobutoki et al. |
| 4,975,616 A | 12/1990 | Park |
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |

(Continued)

FOREIGN PATENT DOCUMENTS

| | | |
|---|---|---|
| AU | 2015100710 | 7/2015 |
| CA | 2355434 | 2/2002 |

(Continued)

OTHER PUBLICATIONS

U.S. Appl. No. 12/750,054, filed Mar. 30, 2010, Hill.

(Continued)

*Primary Examiner* — Daryl Pope
(74) *Attorney, Agent, or Firm* — Brownstein Hyatt Farber Schreck, LLP

(57) ABSTRACT

A thin haptic feedback element suitable to provide a perceivable single pulse haptic feedback including an electromagnetic coil, a permanent magnet or other magnetic field source rotatably coupled to an eccentric mass through a torque-increasing drive train. The haptic feedback element may rapidly accelerate and decelerate the eccentric mass to produce a perceivable haptic feedback.

20 Claims, 5 Drawing Sheets

(56) References Cited

U.S. PATENT DOCUMENTS

| | | |
|---|---|---|
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,078,308 A | 6/2000 | Rosenberg et al. |
| 6,127,756 A | 10/2000 | Iwaki |
| 6,135,886 A | 10/2000 | Armstrong |
| 6,218,966 B1 | 4/2001 | Goodwin |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 * | 8/2002 | An .................. G05G 9/047 345/161 |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,182,691 B1 | 2/2007 | Schena |
| 7,194,645 B2 | 3/2007 | Bieswanger et al. |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,333,604 B2 | 2/2008 | Zernovizky et al. |
| 7,334,350 B2 | 2/2008 | Ellis |
| 7,348,968 B2 | 3/2008 | Dawson |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,595 B2 | 12/2008 | Kessler et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,639,232 B2 | 12/2009 | Grant et al. |
| 7,641,618 B2 | 1/2010 | Noda et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,031,172 B2 | 10/2011 | Kruse et al. |
| 8,044,940 B2 | 10/2011 | Narusawa |
| 8,069,881 B1 | 12/2011 | Cunha |
| 8,077,145 B2 | 12/2011 | Rosenberg et al. |
| 8,081,156 B2 | 12/2011 | Ruettiger |
| 8,082,640 B2 | 12/2011 | Takeda |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,174,372 B2 | 5/2012 | da Costa |
| 8,179,202 B2 | 5/2012 | Cruz-Hernandez et al. |
| 8,188,623 B2 | 5/2012 | Park |
| 8,205,356 B2 | 6/2012 | Ellis |
| 8,210,942 B2 | 7/2012 | Shimabukuro et al. |
| 8,232,494 B2 | 7/2012 | Purcocks |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,344,834 B2 | 1/2013 | Niiyama |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,679 B2 | 2/2013 | Paleczny et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,411,058 B2 | 4/2013 | Wong et al. |
| 8,446,264 B2 | 5/2013 | Tanase |
| 8,451,255 B2 | 5/2013 | Weber et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |

(56) References Cited

U.S. PATENT DOCUMENTS

| | | |
|---|---|---|
| 8,542,134 B2 | 9/2013 | Peterson et al. |
| 8,545,322 B2 | 10/2013 | George et al. |
| 8,547,341 B2 | 10/2013 | Takashima et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,686,952 B2 | 4/2014 | Pope et al. |
| 8,710,966 B2 | 4/2014 | Hill |
| 8,723,813 B2 | 5/2014 | Park et al. |
| 8,735,755 B2 | 5/2014 | Peterson et al. |
| 8,760,273 B2 | 6/2014 | Casparian et al. |
| 8,787,006 B2 | 7/2014 | Golko et al. |
| 8,798,534 B2 | 8/2014 | Rodriguez et al. |
| 8,836,502 B2 | 9/2014 | Culbert et al. |
| 8,857,248 B2 | 10/2014 | Shih et al. |
| 8,860,562 B2 | 10/2014 | Hill |
| 8,866,600 B2 | 10/2014 | Yang et al. |
| 8,928,621 B2 | 1/2015 | Ciesla et al. |
| 8,948,821 B2 | 2/2015 | Newham et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,019,088 B2 | 4/2015 | Zawacki et al. |
| 9,072,576 B2 | 7/2015 | Nishiura |
| 9,083,821 B2 | 7/2015 | Hughes |
| 9,092,129 B2 | 7/2015 | Abdo et al. |
| 9,098,991 B2 | 8/2015 | Park et al. |
| 9,131,039 B2 | 9/2015 | Behles |
| 9,134,834 B2 | 9/2015 | Reshef |
| 9,158,379 B2 | 10/2015 | Cruz-Hernandez et al. |
| 9,189,932 B2 | 11/2015 | Kerdemelidis et al. |
| 9,201,458 B2 | 12/2015 | Hunt et al. |
| 9,235,267 B2 | 1/2016 | Pope et al. |
| 9,274,601 B2 | 3/2016 | Faubert et al. |
| 9,274,602 B2 | 3/2016 | Garg et al. |
| 9,274,603 B2 | 3/2016 | Modarres et al. |
| 9,300,181 B2 | 3/2016 | Maeda et al. |
| 9,317,116 B2 | 4/2016 | Ullrich et al. |
| 9,325,230 B2 | 4/2016 | Yamada et al. |
| 9,357,052 B2 | 5/2016 | Ullrich |
| 9,454,239 B2 | 9/2016 | Elias |
| 9,477,342 B2 | 10/2016 | Daverman et al. |
| 9,501,912 B1 | 11/2016 | Okandan |
| 9,594,450 B2 | 3/2017 | Lynn et al. |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao |
| 2007/0099574 A1 | 5/2007 | Wang |
| 2007/0152974 A1 | 7/2007 | Kim et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0158149 A1 | 7/2008 | Levin |
| 2008/0165148 A1 | 7/2008 | Williamson |
| 2008/0181501 A1 | 7/2008 | Faraboschi |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2009/0002328 A1 | 1/2009 | Ullrich et al. |
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0167704 A1 | 7/2009 | Terlizzi et al. |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0267892 A1 | 10/2009 | Faubert |
| 2009/0267920 A1 | 10/2009 | Faubert et al. |
| 2009/0305744 A1 | 12/2009 | Ullrich |
| 2009/0313542 A1 | 12/2009 | Cruz-Hernandez et al. |
| 2010/0020036 A1 | 1/2010 | Hui et al. |
| 2010/0053087 A1 | 3/2010 | Dai et al. |
| 2010/0089735 A1 | 4/2010 | Takeda et al. |
| 2010/0141606 A1 | 6/2010 | Bae et al. |
| 2010/0152620 A1 | 6/2010 | Ramsay et al. |
| 2010/0164894 A1 | 7/2010 | Havskjold et al. |
| 2010/0188422 A1 | 7/2010 | Shingai et al. |
| 2010/0194547 A1 | 8/2010 | Terrell et al. |
| 2010/0231508 A1 | 9/2010 | Cruz-Hernandez et al. |
| 2010/0231550 A1 | 9/2010 | Cruz-Hernandez et al. |
| 2010/0265197 A1 | 10/2010 | Purdy |
| 2010/0309141 A1 | 12/2010 | Cruz-Hernandez et al. |
| 2010/0328229 A1 | 12/2010 | Weber et al. |
| 2011/0053577 A1 | 3/2011 | Lee et al. |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0163985 A1 | 7/2011 | Bae et al. |
| 2011/0193824 A1 | 8/2011 | Modarres et al. |
| 2011/0203912 A1 | 8/2011 | Niu |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1 | 12/2011 | Tong |
| 2011/0304559 A1 | 12/2011 | Pasquero |
| 2012/0068957 A1 | 3/2012 | Puskarich et al. |
| 2012/0075198 A1 | 3/2012 | Sulem et al. |
| 2012/0092263 A1 | 4/2012 | Peterson et al. |
| 2012/0126959 A1 | 5/2012 | Zarrabi et al. |
| 2012/0127088 A1 | 5/2012 | Pance et al. |
| 2012/0133494 A1 | 5/2012 | Cruz-Hernandez et al. |
| 2012/0139844 A1 | 6/2012 | Ramstein et al. |
| 2012/0256848 A1 | 10/2012 | Madabusi Srinivasan |
| 2012/0268412 A1 | 10/2012 | Cruz-Hernandez et al. |
| 2012/0274578 A1 | 11/2012 | Snow et al. |
| 2012/0280927 A1 | 11/2012 | Ludwig |
| 2012/0327006 A1 | 12/2012 | Israr et al. |
| 2013/0002411 A1 | 1/2013 | Henderson et al. |
| 2013/0027345 A1 | 1/2013 | Binzel |
| 2013/0063356 A1 | 3/2013 | Martisauskas |
| 2013/0106699 A1 | 5/2013 | Babatunde |
| 2013/0120290 A1 | 5/2013 | Yumiki et al. |
| 2013/0124076 A1 | 5/2013 | Bruni et al. |
| 2013/0181913 A1 | 7/2013 | Cole et al. |
| 2013/0191741 A1 | 7/2013 | Dickinson et al. |
| 2013/0200732 A1 | 8/2013 | Jun et al. |
| 2013/0207793 A1 | 8/2013 | Weaber et al. |
| 2013/0217491 A1 | 8/2013 | Hilbert et al. |
| 2013/0222280 A1 | 8/2013 | Sheynblat et al. |
| 2013/0228023 A1 | 9/2013 | Drasnin et al. |
| 2013/0261811 A1 | 10/2013 | Yagi et al. |
| 2013/0300590 A1 | 11/2013 | Dietz et al. |
| 2014/0035397 A1 | 2/2014 | Endo et al. |
| 2014/0082490 A1 | 3/2014 | Jung et al. |
| 2014/0091857 A1 | 4/2014 | Bernstein |
| 2014/0197936 A1 | 7/2014 | Biggs et al. |
| 2014/0232534 A1 | 8/2014 | Birnbaum et al. |

(56) References Cited

U.S. PATENT DOCUMENTS

| | | |
|---|---|---|
| 2014/0247227 A1 | 9/2014 | Jiang et al. |
| 2014/0267076 A1 | 9/2014 | Birnbaum et al. |
| 2014/0267952 A1 | 9/2014 | Sirois |
| 2015/0005039 A1 | 1/2015 | Liu et al. |
| 2015/0061848 A1 | 3/2015 | Hill |
| 2015/0090572 A1 | 4/2015 | Lee et al. |
| 2015/0109215 A1 | 4/2015 | Puskarich |
| 2015/0169059 A1 | 6/2015 | Behles et al. |
| 2015/0194165 A1 | 7/2015 | Faaborg et al. |
| 2015/0220199 A1 | 8/2015 | Wang et al. |
| 2015/0227204 A1 | 8/2015 | Gipson et al. |
| 2015/0296480 A1 | 10/2015 | Kinsey et al. |
| 2015/0324049 A1 | 11/2015 | Kies et al. |
| 2015/0349619 A1 | 12/2015 | Degner et al. |
| 2016/0049265 A1 | 2/2016 | Bernstein |
| 2016/0063826 A1 | 3/2016 | Morrell et al. |
| 2016/0071384 A1 | 3/2016 | Hill |
| 2016/0162025 A1 | 6/2016 | Shah |
| 2016/0163165 A1 | 6/2016 | Morrell et al. |
| 2016/0172953 A1 | 6/2016 | Hamel et al. |
| 2016/0195929 A1 | 7/2016 | Martinez et al. |
| 2016/0196935 A1 | 7/2016 | Bernstein |
| 2016/0211736 A1 | 7/2016 | Moussette et al. |
| 2016/0216764 A1 | 7/2016 | Morrell et al. |
| 2016/0216766 A1 | 7/2016 | Puskarich |
| 2016/0231815 A1 | 8/2016 | Moussette et al. |
| 2016/0233012 A1 | 8/2016 | Lubinski et al. |
| 2016/0241119 A1 | 8/2016 | Keeler |
| 2016/0259480 A1 | 9/2016 | Augenbergs et al. |
| 2016/0306423 A1 | 10/2016 | Uttermann et al. |
| 2016/0371942 A1 | 12/2016 | Smith, IV et al. |
| 2017/0038905 A1 | 2/2017 | Bijamov et al. |

FOREIGN PATENT DOCUMENTS

| | | |
|---|---|---|
| CN | 1817321 | 8/2006 |
| CN | 101409164 | 4/2009 |
| CN | 102025257 | 4/2011 |
| CN | 102315747 | 1/2012 |
| CN | 102713805 | 10/2012 |
| CN | 103416043 | 11/2013 |
| CN | 104220963 | 12/2014 |
| DE | 19517630 | 11/1996 |
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2264562 A3 | 12/2010 |
| EP | 2315186 | 4/2011 |
| EP | 2374430 | 10/2011 |
| EP | 2395414 | 12/2011 |
| EP | 2461228 | 6/2012 |
| EP | 2631746 | 8/2013 |
| EP | 2434555 | 10/2013 |
| JP | H05301342 A2 | 11/1993 |
| JP | 2002199689 | 7/2002 |
| JP | 2002102799 | 9/2002 |
| JP | 200362525 | 3/2003 |
| JP | 2004236202 | 8/2004 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| TW | 201218039 | 5/2012 |
| TW | 201425180 | 7/2014 |
| WO | WO 97/16932 | 5/1997 |
| WO | WO 01/59588 | 8/2001 |
| WO | WO 02/073587 | 9/2002 |
| WO | WO 03/038800 | 5/2003 |
| WO | WO 2006/057770 | 6/2006 |
| WO | WO 2007/114631 | 10/2007 |
| WO | WO 2008/075082 | 6/2008 |
| WO | WO 2009/038862 | 3/2009 |
| WO | WO 2009/068986 | 6/2009 |
| WO | WO 2009/097866 | 8/2009 |
| WO | WO 2009/122331 | 10/2009 |
| WO | WO 2009/150287 | 12/2009 |
| WO | WO 2010/085575 | 7/2010 |
| WO | WO 2010/087925 | 8/2010 |
| WO | WO 2011/007263 | 1/2011 |
| WO | WO 2012/052635 | 4/2012 |
| WO | WO 2012/129247 | 9/2012 |
| WO | WO 2013/069148 | 5/2013 |
| WO | WO 2013/169299 | 11/2013 |
| WO | WO 2013/169302 | 11/2013 |
| WO | WO 2014/018086 | 1/2014 |
| WO | WO 2015/023670 | 2/2015 |

OTHER PUBLICATIONS

U.S. Appl. No. 12/887,455, filed Sep. 21, 2010, Puskarich et al.
U.S. Appl. No. 12/950,940, filed Nov. 19, 2010, Pance et al.
U.S. Appl. No. 13/630,867, filed Sep. 28, 2012, Bernstein.
U.S. Appl. No. 13/943,639, filed Jul. 16, 2013, Hill.
U.S. Appl. No. 14/059,693, filed Oct. 22, 2013, Puskarich.
U.S. Appl. No. 14/165,475, filed Jan. 27, 2014, Havskjold et al.
U.S. Appl. No. 14/512,927, filed Oct. 13, 2014, Hill.
U.S. Appl. No. 14/841,582, filed Aug. 31, 2015, Morrell et al.
U.S. Appl. No. 14/928,465, filed Oct. 30, 2015, Bernstein.
Astronomer's Toolbox, "The Electromagnetic Spectrum," http://imagine.gsfc.nasa.gov/science/toolbox/emspectrum1.html, updated Mar. 2013, 4 pages.
Kim et al., "Tactile Rendering of 3D Features on Touch Surfaces," UIST '13, Oct. 8-11, 2013, St. Andrews, United Kingdom, 8 pages.
U.S. Appl. No. 14/942,521, filed Nov. 16, 2015, Hill.
U.S. Appl. No. 14/910,108, filed Feb. 4, 2016, Martinez et al.
U.S. Appl. No. 15/045,761, filed Feb. 17, 2016, Morrell et al.
U.S. Appl. No. 15/046,194, filed Feb. 17, 2016, Degner et al.
U.S. Appl. No. 15/047,447, filed Feb. 18, 2016, Augenbergs et al.
Hasser et al., "Preliminary Evaluation of a Shape-Memory Alloy Tactile Feedback Display," Advances in Robotics, Mechatronics, and Haptic Interfaces, ASME, DSC-vol. 49, pp. 73-80, 1993.
Hill et al., "Real-time Estimation of Human Impedance for Haptic Interfaces," Stanford Telerobotics Laboratory, Department of Mechanical Engineering, Standford University, 6 pages, at least as early as Sep. 30, 2009.
Lee et al, "Haptic Pen: Tactile Feedback Stylus for Touch Screens," Mitsubishi Electric Research Laboratories, http://wwwlmerl.com, 6 pages, Oct. 2004.
Nakamura, "A Torso Haptic Display Based on Shape Memory Alloy Actuators," Massachusetts Institute of Technology, 2003, pp. 1-123.
U.S. Appl. No. 15/583,938, filed May 1, 2017, Hill.
U.S. Appl. No. 15/621,966, filed Jun. 13, 2017, Pedder et al.
U.S. Appl. No. 15/621,930, filed Jun. 13, 2017, Wen et al.
U.S. Appl. No. 15/622,017, filed Jun. 13, 2017, Yang et al.
U.S. Appl. No. 15/641,192, filed Jul. 3, 2017, Miller et al.

* cited by examiner

9,779,592 B1

GEARED HAPTIC FEEDBACK ELEMENT

TECHNICAL FIELD

This application claims the benefit under 35 U.S.C. §119(e) of U.S. Provisional Patent Application No. 61/883,147 filed Sep. 26, 2013, entitled "Haptic Generator Employing a Gear Train," and U.S. Provisional Patent Application No. 61/886,847 filed Oct. 4, 2013, entitled "Haptic Generator Employing a Gear Train," both of which are incorporated by reference as if fully disclosed herein.

TECHNICAL FIELD

This disclosure relates to haptic devices and, more particularly, to single-pulse haptic feedback elements for portable electronic devices.

BACKGROUND

Many modern electronic devices include haptic components to provide kinesthetic feedback to a user of the device. For example, an electronic device such a cellular telephone may include a vibration motor that may vibrate for a period of time to notify a user of an incoming telephone call. Electronic devices which may benefit from haptic components include cellular telephones, smart phones, personal digital assistants, tablet computers, laptop computers, track pads, wearable devices, and peripheral input devices such as keyboards, buttons, dials and computer mice.

Further, market demand for improved electronic devices has motivated advancements in device durability, thinness, and weight. As a result, internal components such as haptic devices are expected to occupy a smaller volume. Designing a haptic device that is durable, thin, and sufficiently powerful to enable the user to perceive the intended haptic effect presents several challenges. For example, many haptic devices require a cylindrical motor to drive a mass positioned eccentrically about the motor's axis. As the cylindrical motor spins, the eccentric mass experiences asymmetric forces causing a perceivable displacement of the mass and motor within a plane tangent to the axis of rotation. With a sufficiently high number of revolutions per minute, the cylindrical motor and eccentric mass are consistently and asymmetrically displaced. If the cylindrical motor is structurally coupled to the housing of an electronic device, this displacement may be perceived as a vibration.

However, due to the limited space within portable electronic devices having reduced thickness, a cylindrical drive motor and an eccentric mass are conventionally assembled so that the shaft of the drive motor is the axis of rotation of the eccentric mass. In this manner, the eccentric mass and drive motor may occupy a smaller space within the housing of portable electronic device. However, this configuration may limit the number of positions and orientations a haptic element may take within the housing.

Moreover, as a cylindrical drive motor decreases in size it also decreases in power and torque and may not have sufficient torque to spin an eccentric mass to a speed sufficient for a user to perceive a vibration. Similarly, the eccentric mass may also decrease in size such that displacement of the mass is no longer sufficient to cause a vibration of adequate magnitude to be perceived by a user. Accordingly, the dimensions, size, and shape of electronic devices including a cylindrical drive motor and eccentric mass may be undesirably constrained by the minimum size, shape, and torque requirements of the cylindrical drive motor and eccentric mass.

In other cases, a cylindrical drive motor with an eccentric mass may be undesirable or unsuitable as a haptic feedback element. For example, a single pulse or a series of distinct pulses may be desirable to notify a user of a particular event. As a result of relatively low torque produced by a relatively small drive motor, it may not be possible for a cylindrical drive motor to spin and stop an eccentric mass with sufficient speed to product a single pulse. As a result, a cylindrical vibration motor may be limited in both minimum size and the type of haptic feedback it may provide.

Accordingly, there may be a present need for a durable, thin, and high torque haptic feedback element suitable to provide both vibration and single pulse haptic feedback.

SUMMARY

Embodiments described herein may relate to or take the form of durable and thin haptic feedback elements suitable to provide a perceivable single pulse haptic feedback. Such embodiments may take the form of a haptic feedback element including an electromagnetic coil, a permanent magnet or other magnetic field source that is rotatable about a first axis positioned proximate the coil, a first gear fixedly coupled to the magnetic field source, a second gear rotatably coupled to the first gear, and a mass element fixedly coupled to the second gear positioned eccentrically to the second axis. The mass element may be a metal such as steel or tungsten.

In some embodiments, angular displace or rotation of the first gear may cause an angular displacement or rotation of the second gear. The gear ratio between the first and second gear may be 1:10 such that for every ten rotations of the first gear, the second gear may rotate once. In some embodiments, other gear ratios are contemplated.

Further embodiments may include an electromagnetic coil operable in at least two modes. In a first mode, the electromagnetic coil may include alternating or otherwise changing the direction of current, and therefore the magnetic field through the core, at a defined rate. In many cases, the varying magnetic field may cause the permanent magnet to rotate. In another embodiment, a second mode of the electromagnetic coil may include a direct current in order to provide a consistent magnetic field through the core, impeding further rotation of the permanent magnet.

In still further embodiments, more than one additional gear may be used. For example, a third gear may be positioned between the first gear and the second gear.

Embodiments described herein may also relate to or take the form of a method of providing haptic feedback including operations of receiving a request for haptic feedback, providing current of a first polarity to an electromagnetic coil magnetically proximate a rotatable magnetic field source, determining angle of rotation of the rotatable magnetic field source, providing current of a second polarity to the electromagnetic coil, and lastly applying a braking current to the electromagnetic coil. In some embodiments, an eccentric mass may be rotatably coupled to the magnetic field source.

In related embodiments, the operations of providing a current of a first polarity, determining an angle of rotation, and providing a current of a second polarity repeat a selected number of times prior to the operation of applying a braking current. The number of repetitions may be determined based on the angle of rotation of the eccentric mass. In some cases, the angle of rotation of the eccentric mass may be one tenth of the angle of rotation of rotatable magnetic field source such that for every ten rotations of the rotatable magnetic field source, the eccentric mass may rotate once.

BRIEF DESCRIPTION OF THE FIGURES

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The use of the same or similar reference numerals in different drawings indicates similar, related, or identical items.

DETAILED DESCRIPTION

Embodiments described herein may relate to or take the form of durable and thin haptic feedback elements suitable to provide a perceivable single pulse haptic feedback. Such embodiments may take the form of a haptic element including an electromagnetic coil, a permanent magnet or other magnetic field source that is rotatable. The rotatable magnetic field source may be coupled to an eccentric mass through a gear drive system. The gear drive system may sufficiently increase the torque at the eccentric mass such that the mass may rapidly reach a target rotation speed. In further embodiments, the haptic element may apply a braking force to a spinning eccentric mass so that the mass abruptly stops.

Figure 1:
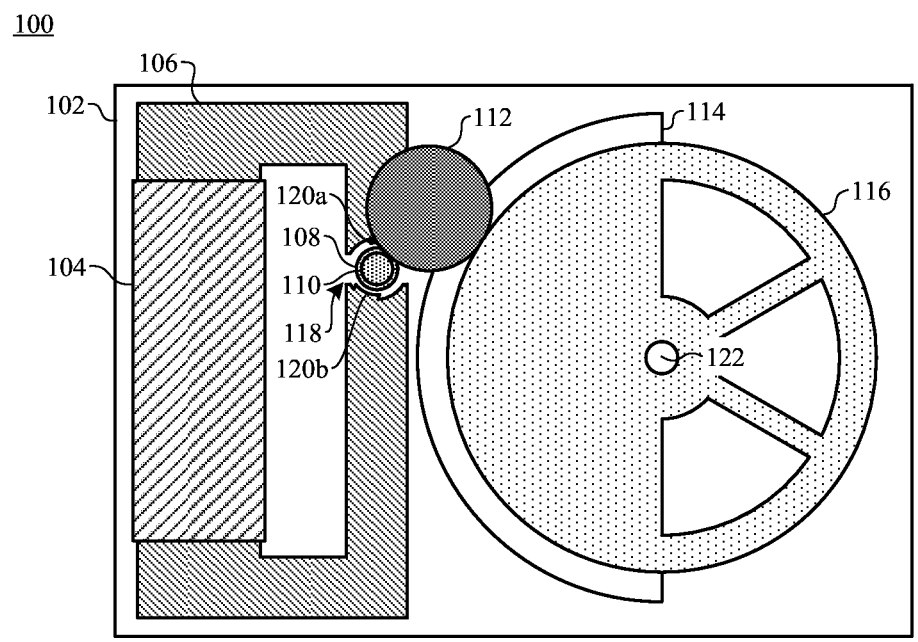
FIG. 1 is a top plan view of the haptic feedback element showing an eccentric mass and gear in a first position.

FIG. 1 is a top plan view of a haptic feedback element. As shown, the haptic feedback element 100 includes a housing 102, a coil 104, a stator core 106, a magnetic source rotor 108, a first gear 110, 114 an intermediate gear 112, an eccentric mass 114, and a large gear 116. The coil 104 may be wrapped around a portion of the stator core 106, which may take a substantially rectangular loop shape. The stator core may be a ferromagnetic material, such as steel. Within the stator core 106 may be a rotor aperture 118. The rotor aperture 118 may be circular and sized such that the magnetic source rotor 108 may be positioned and free to rotate therein. The magnetic source rotor 108 may include a shaft (not shown) which may connect to a bearing or bearing surface which may allow free rotation of the magnetic source rotor 108. Similarly, the large gear 116 may also include a shaft that may be connected to a separate bearing surface. Each of the bearing surfaces may be, for example, a jewel bearing, spherical roller bearing, needle roller bearing, toroidal roller bearing, or any other bearing surface such as an interface formed between dissimilar materials such as steel and brass.

The rotor aperture 118 may also include cogging notches 120a,120b, which may extend into the rotor apertures 118 a certain select distance. The cogging notches 120a and 120b may be diametrically opposed across rotor aperture 118, and may be positioned 45 degrees off a longitudinal axis defined by the portion of the stator core 108 containing the rotor aperture 118. The angular position from the longitudinal axis may vary between embodiments. In some embodiments, the cogging notches serve to ensure that, while at rest, the magnetic moment of the magnetic source rotor 108 is aligned in a direction that is not parallel to the magnetic field produced by the coil 104 and directed through the stator core 106. In this manner, when the coil is energized, the magnetic source rotor 108 will experience a rotational torque. Some embodiments may use different methods to achieve the same or similar effect. For example, small indentations may be formed in the stator core 106 along a sidewall of the rotor aperture 118, the rotor aperture 118 as an ellipsoid, or the two halves of the stator core 106 that define the rotor aperture 118 may be further offset.

The cogging notches 120a and 120b may, when no current is presented to the coil 104, encourage the magnetic source rotor 108 to rotate 45 degrees off the longitudinal axis defined by the portion of the stator core 106 containing the rotor aperture 118. On the other hand, when the coil 104 is energized with an electric current, magnetic flux may be focused within the stator core 106 such that a magnetic field may concentrate within the rotor aperture 118. This magnetic field may encourage the magnetic source rotor 108 to rotate to align tangent to the longitudinal axis or, in other words, to rotate 135 degrees. Once the current is cut to the coil 104, the cogging notches 120a and 118 will encourage the magnetic source rotor 108 to rotate an additional 45 degrees in the same direction as the previous motion. The motion of the magnetic source rotor 108 is described in detail below. The magnetic source rotor 108 may be biased to rotate in a single direction by the offset position of the cogging notches 120a and 120b. In some examples, the cogging notices 120a and 120b may be positioned to bias the magnetic source rotor 108 to clockwise rotation or to counterclockwise rotation. In still further examples, the cogging notices 120a and 120b may not be present. In still further examples, the magnetic source rotor 108 may be configured to rotate in either the clockwise or counterclockwise direction. The direction of rotation of the magnetic source rotor 108 may be determined by the direction of a magnetic field through the stator core 106. In related examples, the direction of the magnetic field through the stator core 106 may be rapidly alternated to encourage and control rotation of the magnetic source rotor 108.

The process of rotation of the magnetic source rotor 108 may start with the coil in an unenergized state. Because the magnetic source rotor 108 is a permanent magnet and because the stator core 106 may be constructed of ferromagnetic material, the magnetic source rotor 108 may be attracted to the stator core 106. In one example, the magnetic field from the magnetic source rotor 108 may be modeled, using Maxwell's equations, as single magnetic moment having a vector aligned from a south pole to the north pole. One may appreciate that the torque τ on this moment is equal to the magnitude of magnetic flux density B through the stator 106 multiplied by the magnitude of the magnetic moment m of the magnetic source rotor 108 multiplied by the sine of the angle θ between the stator and the magnetic source rotor:

$$\tau = |B| \times |m| \times \sin(\theta)$$

One may appreciate that when the magnetic source rotor 108 is aligned with cogging notches 120a and 120b the angle θ is non-zero. In certain embodiments such as the embodiment shown in FIG. 1, the angle θ may be 45 degrees, or π/4 radians. Thus, because the coil 104 is not energized, and thus the magnetic flux density B through the stator 106 is therefore 0 T, the torque τ on the magnetic source rotor 108 when the coils is not energized is 0 Nm. However, when the coil 104 is subsequently energized, the magnetic flux density B which is aligned with the longitudinal direction of the stator is non-zero. As a result, non-zero torque τ is exerted on the magnetic source rotor 108, causing the magnetic source rotor 108 to rotate. One may further appreciate that by alternating the polarity of the current applied to the coil 104, the magnetic source rotor 108 may spin in a continuous fashion. In this manner, the system may function as a single phase synchronous motor. One may appreciate that by selecting a magnetic source rotor 108 with a strong magnetic field, the torque τ exerted on the magnetic source rotor 108 may increase. Similarly, increasing the current applied to the coil 104 may also increase the torque π exerted on the magnetic source rotor 108. In this manner, the haptic feedback element 100 may be designed so as to spin the large gear 116 and eccentric mass 114 with high torque and at high speed.

Coupled to the magnetic source rotor 108 may be a first gear 110. The first gear 110 may be meshed with an intermediate gear 112. The intermediate gear 112 may itself be meshed with a large gear 116. In this manner, when the magnetic source rotor 108 is caused to rotate, the intermediate gear 112 may in turn cause the large gear 116 to rotate. The gear ratio between the first gear 110 and the large gear 116 may be 1:10 such that when the magnetic source rotor 108 spins a full revolution, the large gear 116 spins a tenth of a revolution. Or, in another example, when the magnetic source rotor 108 spins ten revolutions, the large gear 116 may spin a single rotation. One may appreciate that torque at the large gear 116 may be greater than at the magnetic source rotor 108.

Coupled to the large gear may be an eccentric mass 114. In certain embodiments, the eccentric mass 114 may occupy half of the surface area of the large gear 116. In some embodiments, the eccentric mass may occupy more or less than half of the surface area of the large gear 116. As the large gear 116 spins, the eccentric mass 114 may experience asymmetric forces causing a perceivable displacement of the eccentric mass 114 and large gear 116 within a plane tangent to the rotational axis 122. By causing the magnetic field rotor 108 to spin, the eccentric mass 114 may also spin, causing the haptic element to perceivably vibrate.

In another embodiment, a braking force may be applied. For example, while the eccentric mass is spinning, the coil 104 may be presented with a constant current. One may appreciate that this will stop the magnetic source rotor 108 from rotating. In some embodiments, a current may be applied to the coil 104 that has the opposite direction of the current required to further accelerate the magnetic source rotor 108. If the magnetic source rotor 108 stops rotating, the intermediate gear 112 also stops, and thus the large gear 116 will also stop. The stoppage of the large gear 116 may be abrupt, on the order of a few milliseconds. In some embodiments, the stoppage period may be longer or shorter. One may appreciate, however, that an abrupt stoppage of the large gear 116 will also cause an abrupt stoppage of the eccentric mass 114. To release the built up momentum within the eccentric mass 114, the housing 102 may abruptly buck. If the braking force is applied after a single rotation of the large gear 116, the haptic element 100 may provide a single-shot haptic feedback. In still further examples, a braking force may be applied by reversing the current within the coil 104 so as to reverse the magnetic field through the stator core 106. In this manner, the magnetic field may oppose the direction of rotation of the magnetic source rotor 108, causing the magnetic source rotor 108 to brake.

Figure 2:
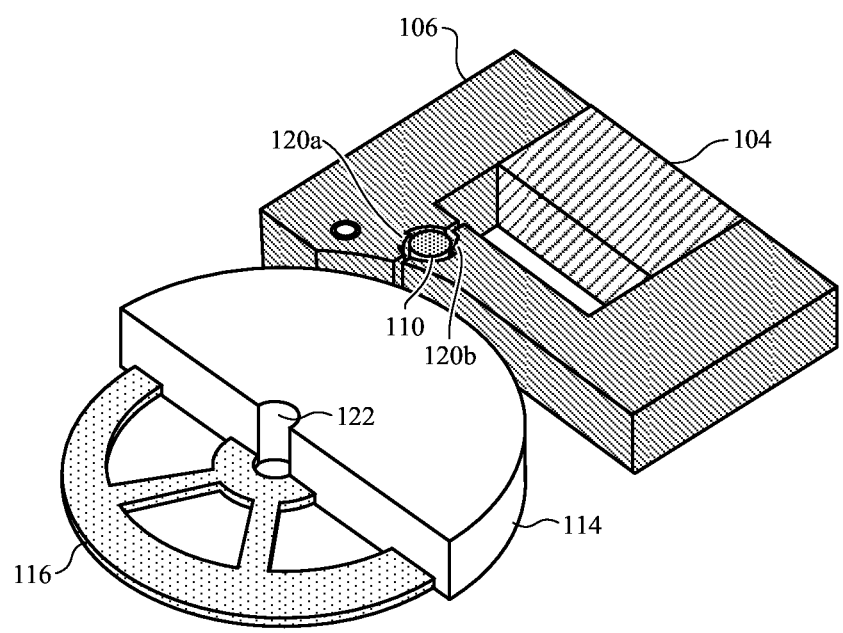
FIG. 2 is a bottom isometric view of haptic feedback element employing a three-gear drive train.

FIG. 2 is a bottom isometric view of haptic feedback element 100 employing a three-gear drive train. As shown, the haptic feedback element 100 includes a housing 102 (not shown), a coil 104, a stator core 106, magnetic source rotor 108, an intermediate gear 112 (not shown), an eccentric mass 114, and the large gear 116 rotating about the bearing axis 122. In the illustrated embodiment, the eccentric mass 114 is oriented along one half of the large gear 116. In one embodiment described above, a single-shot haptic feedback may be desirable. In order to prevent the perception of vibration, the large gear 116 may be rotated for a single rotation only before a braking force may be applied. As previously noted, the braking force may not immediately stop the eccentric mass 114. Rather, the eccentric mass 114 and large gear 116 may take a portion of time to come to a complete stop. In some embodiments, the large gear 116 and eccentric mass 114 may take up to a quarter of a revolution to come to a complete stop. For example, FIG. 3 is a top plan view of the haptic feedback element as shown in FIG. 1.

Figure 3:
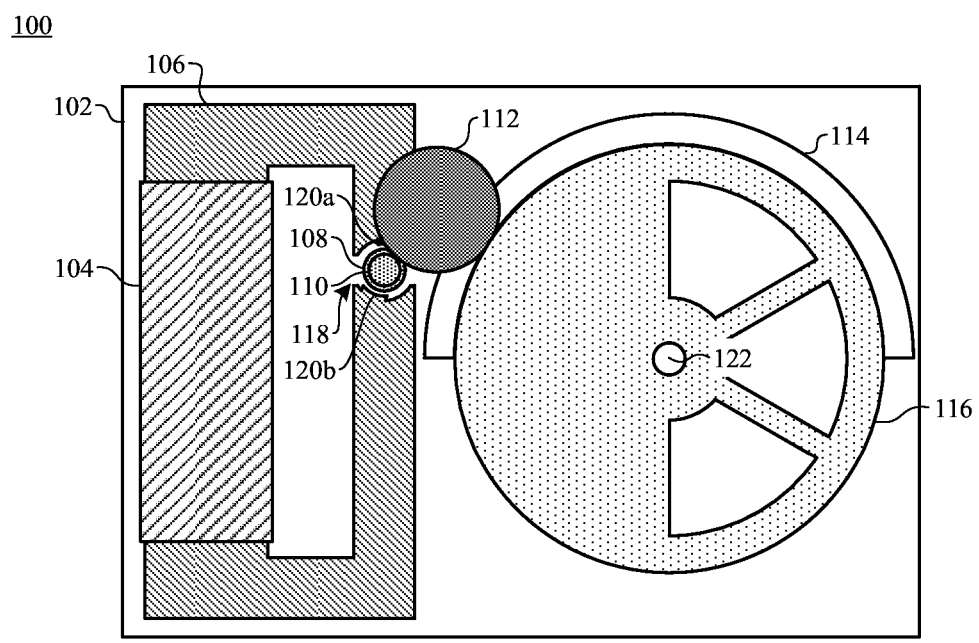
FIG. 3 is a top plan view of the haptic feedback element as shown in FIG. 1, showing an eccentric mass and gear in a second position.

FIG. 3 shows the haptic feedback element 100, the housing 102, the coil 104, the stator core 106, magnetic source rotor 108, the first gear 110, the intermediate gear 112, the eccentric mass 114, and the large gear 116 rotating about the bearing axis 122. Distinguishing from FIG. 1 is the orientation of the eccentric mass 114, shown rotated 90 degrees from the original position as shown in FIG. 1.

Figure 4:
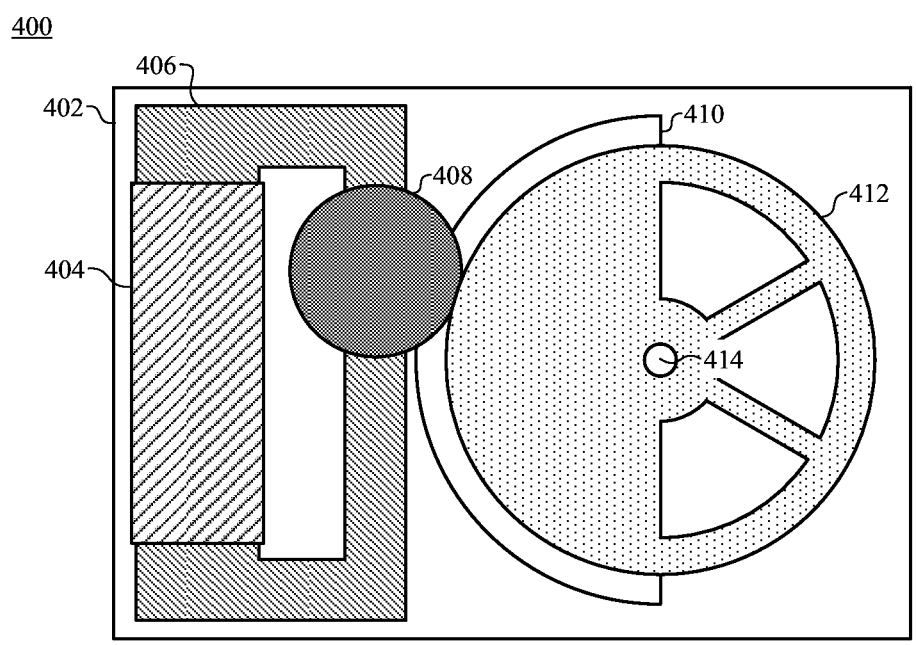
FIG. 4 is a top isometric view of haptic feedback element employing a two-gear drive train.

FIG. 4 is a top plan view of haptic feedback element employing a two-gear drive train. Similar to the embodiment shown in FIGS. 1 and 2, the embodiment of FIG. 3 may include within the haptic feedback element 400 a housing 402, a coil 404, a stator core 406, magnetic source rotor 408 including the first gear, the eccentric mass 410, and the large gear 412 rotating about the bearing axis 414. Distinguishing from FIGS. 1 and 2 is that no intermediate gear is present. Rotation of the magnetic source rotor 408 directly rotates the large gear 412.

Figure 5:
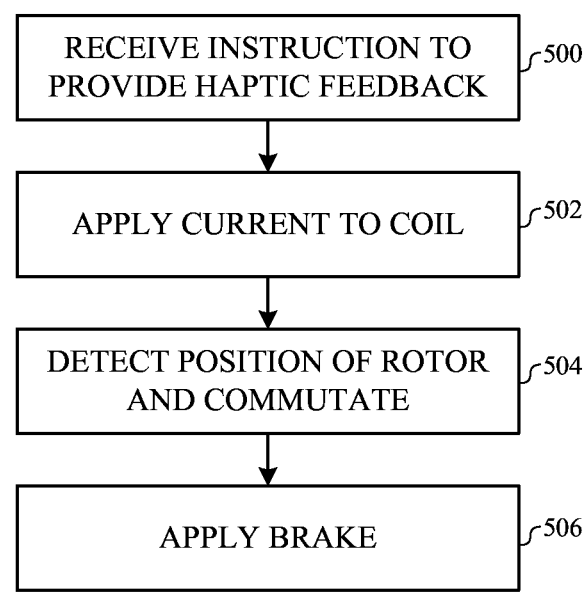
FIG. 5 is a process flow diagram of a method of providing haptic feedback.

FIG. 5 is a process flow diagram of a method of providing haptic feedback. The process may start at operation 500 in which a system receives a command to provide haptic feedback. Thereafter, a current may be applied to a coil at 502. Next, a sensor may determine or detect the position of the rotor in order to commutate the rotor at 504. In certain embodiments, the sensor may include a Hall effect sensor, a reed sensor, an optical sensor, or a current detector coupled to the coil. One may appreciate that any suitable sensor may be used.

For example, a Hall effect sensor may be used to assist in commutating the rotor. In such an example, the rotor may include at least one permanent magnetic field source, such that as the rotor rotates, the magnetic field source rotates as well. In this manner, the Hall sensor may the angular orientation of the rotor based on the orientation of the field generated by the magnetic field source. Once the rotor reaches a certain angle, the Hall sensor may indicate that the current to the coil may be reversed. In this manner, the current in the coil, may be commutated.

One may appreciate that commutating at 530 may repeat many times in order to achieve a select number of revolutions of the rotor. Next, a brake may be applied at 540 in order to stop the rotor from continued motion. In this manner, 540 may cause a haptic feedback of a single buck. In some embodiments, braking may consist of applying a current to the coil in order to produce a magnetic field which applies a torque on the rotor in the opposite direction that the rotor was previously spinning.

Embodiments described herein may relate to or take the form of durable and thin haptic feedback elements suitable to provide a perceivable single pulse haptic feedback. Such embodiments may take the form of a haptic feedback element including an electromagnetic coil, a permanent magnet or other magnetic field source that is rotatable. Through a gear drive system, torque may be increased before spinning an eccentric mass.

Although many embodiments described herein include a single-phase motors, one may appreciate that some embodiments are contemplated. For example, multi-phase motors or other continuous drive or stepper motors may be substituted for the single-phase motor embodiments described herein. For example, certain embodiments may include an eccentric mass or eccentrically weighted gear coupled to the rotating axis of an electric motor. When the motor rotates, the eccentric mass about a shaft or other axis, the element may experience axially asymmetric forces, displacing the mass within a plane perpendicular to the axis of rotation. After reaching a sufficient angular velocity, the displacement of the mass may be perceived as a sustained vibration. In other cases, a haptic element may be repeatedly activated and deactivated to simulate a pulsed vibration. In still further examples, the haptic element may spin up and immediately brake. For example, a braking for may be applied by reversing the polarity of power applied to the electric motor. In still further example, a braking element may engage with the teeth of one or more gears so as to cause the gear to immediately stop.

In still further embodiments, acoustic dampening features may be included to reduce the volume of sound produced by the operation of the haptic element. For example, a haptic element may spin at a frequency that may cause an undesirable high pitch sound to be heard. Such a sound may be unpleasant to those nearby. To account for acoustic effects of the operation of the haptic element, certain components of the haptic element may be constructed of materials selected, at least in part, for their acoustic properties. For example, one or more gears included within the haptic element may be constructed of plastic instead of metal. In another example, the manner in which the haptic element is powered may be changed. For example, the stator coil may be powered by a selected waveform. In some examples, the waveform may cause the teeth of each gear included within the haptic element to be consistently engaged, or otherwise in contact with one another. In other words, the gears may always be always pushing or always pulling against one another. In this manner, gear slippage and grinding (which may lead to undesired sound) may be substantially reduced or eliminated. In other examples, oils or other lubricants may be specially selected to reduce unwanted sounds.

In still further examples, the size of the gears and the gear ratios may be selected specifically to produce sounds above human hearing. For example, a gear ratio may be selected so that any sounds produced by the haptic element are above at least 20 KHz.

In other cases, alternate gear shapes may be selected in order to reduce residual unwanted sound. For example, cycloidal gears or helical gears. In still further embodiments, the gears may be attached to a linear actuator or other cam action gear arrangement such that rotation motion of the stator core is translated directly into linear motion. In such embodiments, the linear actuator may knock against the housing of the haptic element or electronic device in order to provide a single-shot haptic feedback.

Where components or modules of the invention are implemented in whole or in part using software, in one embodiment, these software elements can be implemented to operate with a computing or processing module capable of carrying out the functionality described with respect thereto.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

I claim:

1. A haptic feedback element comprising:
    an electromagnetic coil having a core;
    a magnetic field source rotatable about a first axis, the magnetic field source positioned proximate the core;
    a first gear fixedly coupled to the magnetic field source;
    a second gear rotatably coupled to the first gear, the second gear rotatable about a second axis; and
    a mass element fixedly coupled to the second gear positioned eccentrically to the second axis; wherein
    a first angular displacement of the first gear causes a second angular displacement in the second gear.

2. The haptic feedback element of claim 1, wherein the first angular displacement is greater than one but less than ten times the second angular displacement.

3. The haptic feedback element of claim 1, wherein the first angular displacement is ten times or greater the second angular displacement.

4. The haptic feedback element of claim 1, wherein the electromagnetic coil operates in at least an operation mode and a brake mode.

5. The haptic feedback element of claim 4, wherein the operation mode comprises an alternating a magnetic field through the core.

6. The haptic feedback element of claim 4, wherein the brake mode comprises one of fixing a magnetic field through the electromagnetic coil, reversing a magnetic field through the electromagnetic coil, and alternating a magnetic field within the electromagnetic coil.

7. The haptic feedback element of claim 1, wherein the magnetic field source comprises a permanent magnet.

8. The haptic feedback element of claim 1, further comprising a third gear that rotatably couples the first gear to the second gear.

9. The haptic feedback element of claim 1, wherein the eccentric mass is metal.

10. A method of providing haptic feedback comprising:
    receiving a request for haptic feedback;
    providing current of a first polarity to an electromagnetic coil magnetically proximate a rotatable magnetic field source;
    providing current of a second polarity to the electromagnetic coil; and
    applying a braking current to the electromagnetic coil that causes an eccentric mass rotatably coupled to the rotatable magnetic field source to decelerate.

11. The method of claim 10, wherein the operations of providing a current of a first polarity and providing a current of a second polarity repeat a selected number of times prior to the operation of applying a braking current.

12. The method of claim 11, wherein the selected number of repetitions is determined based on an angle of rotation of the eccentric mass.

13. The method of claim 12, wherein the angle of rotation of the eccentric mass is one tenth of the angle of rotation of rotatable magnetic field source.

14. The method of claim 10, wherein the rotatable coupling between the rotatable magnetic field source and the eccentric mass comprises at least a first gear.

15. The method of claim 12, wherein the angle of rotation of the eccentric mass is determined at least in part by a magnetic field sensor.

16. The method of claim 12, wherein the angle of rotation of the eccentric mass is greater than one tenth of the angle of rotation of rotatable magnetic field source.

17. A haptic feedback element comprising:
a single-phase stepping motor with a drive axis;
a first gear fixedly coupled to the drive axis;
a second gear rotatably coupled to the first gear, the second gear rotatable about an axis of rotation;
a mass element fixedly coupled to the second gear positioned eccentrically to axis of rotation; and
a commutator configured to operate the single-phase stepping motor synchronously.

18. The haptic feedback element of claim 17, wherein a first angular displacement of the first gear causes a second angular displacement in the second gear.

19. The haptic feedback element of claim 18, wherein the first angular displacement is greater than one but less than ten times the second angular displacement.

20. The haptic feedback element of claim 17, wherein a first diameter of the first gear is less than a second diameter of the second gear.

* * * * *